(12) United States Patent
Apps

(10) Patent No.: US 9,452,864 B2
(45) Date of Patent: Sep. 27, 2016

(54) PALLET ASSEMBLY

(71) Applicant: Rehrig Pacific Company, Los Angeles, CA (US)

(72) Inventor: William P. Apps, Alpharetta, GA (US)

(73) Assignee: Rehrig Pacific Company, Los Angeles, CA (US)

(*) Notice: Subject to any disclaimer, the term of this patent is extended or adjusted under 35 U.S.C. 154(b) by 0 days.

(21) Appl. No.: 13/971,091

(22) Filed: Aug. 20, 2013

(65) Prior Publication Data

US 2014/0158025 A1    Jun. 12, 2014

Related U.S. Application Data

(60) Provisional application No. 61/684,845, filed on Aug. 20, 2012.

(51) Int. Cl.
  *B65D 19/38* (2006.01)
  *B65D 19/00* (2006.01)
  *B29C 45/00* (2006.01)

(52) U.S. Cl.
  CPC ....... *B65D 19/0016* (2013.01); *B29C 45/0003* (2013.01); *B65D 19/0073* (2013.01); *B65D 2519/00034* (2013.01); *B65D 2519/00044* (2013.01); *B65D 2519/00069* (2013.01); *B65D 2519/00079* (2013.01); *B65D 2519/0086* (2013.01); *B65D 2519/00104* (2013.01); *B65D 2519/00139* (2013.01); *B65D 2519/00273* (2013.01); *B65D 2519/00293* (2013.01); *B65D 2519/00323* (2013.01);
  (Continued)

(58) Field of Classification Search
  CPC .......... B65D 2519/00034; B65D 2519/00069; B65D 2519/00139

USPC ......... 108/57.25, 51.11, 901, 902, 56.1, 56.3
See application file for complete search history.

(56) References Cited

U.S. PATENT DOCUMENTS 6,705,237 B2 * 3/2004 Moore ........................ 108/57.25
6,758,148 B2 * 7/2004 Torrey et al. ............... 108/51.11
(Continued)

FOREIGN PATENT DOCUMENTS

CN    201068237 Y    6/2008
EP    0775637    5/1997

OTHER PUBLICATIONS

Extended European Search Report for EP Application 13181103.6 dated Oct. 30, 2013.

*Primary Examiner* — Jose V Chen
(74) *Attorney, Agent, or Firm* — Carlson, Gaskey & Olds PC

(57) ABSTRACT

A pallet includes a deck having columns supporting the deck. The deck includes a plurality of ribs extending downwardly from an upper sheet. A reinforcement sheet is secured to lower ends of the ribs. The reinforcement sheet is a coextruded sheet having a first material selected to bond well with the ribs and a second material selected for other improved physical properties. In the example disclosed herein, the second material is chosen for improved fire retardant properties. As one example, the reinforcement sheet can be vibration welded or hot plate welded to the lower ends of the ribs, thereby providing a strong weld between the reinforcement sheet and the ribs, which provides increased performance of the upper deck while the fire retardant layer of the reinforcement sheet provides fire retardant properties to one of the largest surfaces on the pallet.

29 Claims, 10 Drawing Sheets

(52) U.S. Cl.
CPC .............. *B65D 2519/00333* (2013.01); *B65D 2519/00407* (2013.01); *B65D 2519/00412* (2013.01); *B65D 2519/00437* (2013.01); *B65D 2519/00442* (2013.01); *B65D 2519/00562* (2013.01); *B65D 2519/00567* (2013.01)

(56) References Cited

U.S. PATENT DOCUMENTS

| | | | |
|---|---|---|---|
| 6,807,910 B2* | 10/2004 | Apps ........................... | 108/57.25 |
| 7,779,763 B2* | 8/2010 | Valentinsson .............. | 108/57.25 |
| 7,874,256 B2* | 1/2011 | Muirhead .................. | 108/57.25 |
| 7,918,166 B2* | 4/2011 | Apps et al. ................. | 108/57.25 |
| 8,291,838 B2* | 10/2012 | Apps ........................... | 108/57.25 |
| 8,438,981 B2* | 5/2013 | Linares ...................... | 108/57.22 |
| 2005/0145145 A1* | 7/2005 | Ogburn et al. ............. | 108/57.25 |
| 2006/0011108 A1* | 1/2006 | Abu-Isa et al. ............ | 108/57.25 |
| 2006/0201402 A1* | 9/2006 | Moore, Jr. ......... | B65D 19/0012 108/57.25 |
| 2006/0249058 A1 | 11/2006 | Moore et al. | |
| 2008/0053342 A1 | 3/2008 | Muirhead | |
| 2009/0114129 A1* | 5/2009 | Smith et al. ................ | 108/57.25 |
| 2011/0120353 A1 | 5/2011 | Jensen et al. | |
| 2011/0303128 A1* | 12/2011 | Linares ....................... | 108/51.3 |
| 2012/0073479 A1 | 3/2012 | Apps | |

* cited by examiner

PALLET ASSEMBLY

BACKGROUND OF THE INVENTION

The present invention relates generally to pallets. Pallets generally include an upper deck having columns below to support goods thereon above the floor. The columns also provide openings below the deck for the tines of a forklift.

It has been proposed to add additives to the material of the pallet in order to improve its resistance to fire. However, these additives can cause other physical properties of the pallet to decrease, such as strength, toughness and stiffness.

SUMMARY OF THE INVENTION

A pallet according to one embodiment of the present invention includes a deck supported at a distance above the floor by a plurality of columns. The deck includes a plurality of ribs extending downwardly from an upper sheet. A reinforcement sheet is secured to lower ends of the ribs. The reinforcement sheet may be a plurality of coextruded sheets, one having a first material selected to bond well with the ribs and at least one other sheet of a second material selected for other improved physical properties. In one example disclosed herein, the second material is chosen for improved fire retardant properties. As one example, the reinforcement sheet can be vibration welded to the lower ends of the ribs, thereby providing a strong weld between the reinforcement sheet and the ribs. The reinforcement sheet provides increased performance of the upper deck while the fire retardant layer of the reinforcement sheet provides fire retardant properties to one of the largest surfaces on the pallet.

These and other features of the application can be best understood from the following specification and drawings, the following of which is a brief description.

DETAILED DESCRIPTION OF THE PREFERRED EMBODIMENT

Figure 1:
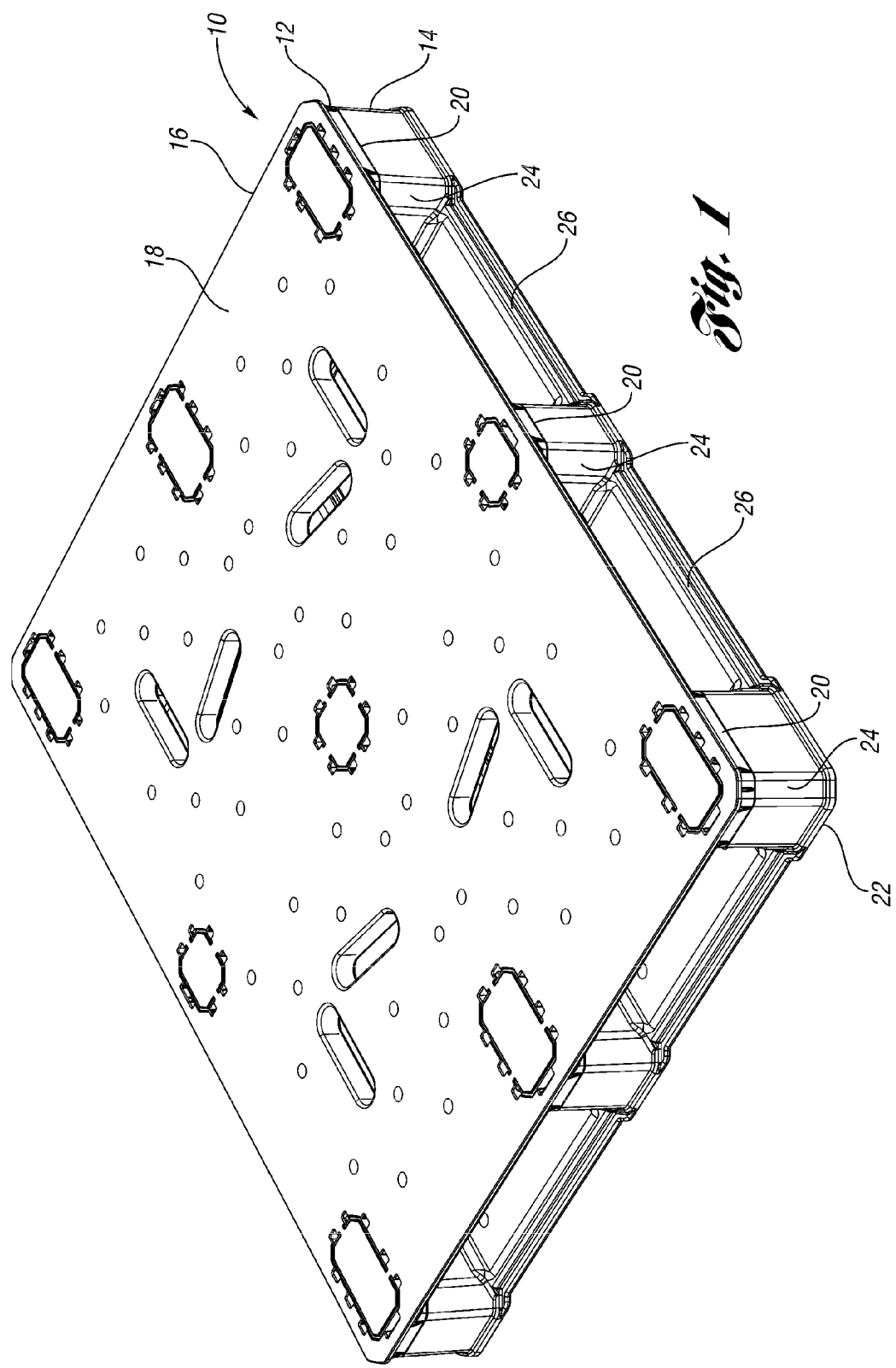
FIG. 1 is a perspective view of a pallet according to one embodiment of the present invention.

A pallet assembly 10 according to one embodiment of the present invention is shown in FIG. 1. The pallet 10 generally includes an upper structure 12 and a lower structure 14. The upper structure 12 includes an upper deck 16 having a generally planar upper support surface 18 and a plurality of column connectors 20 protruding downwardly therefrom. The lower structure 14 includes an integrally molded lower portion 22 including a plurality of columns 24 with runners 26 extending therebetween.

Figure 2:
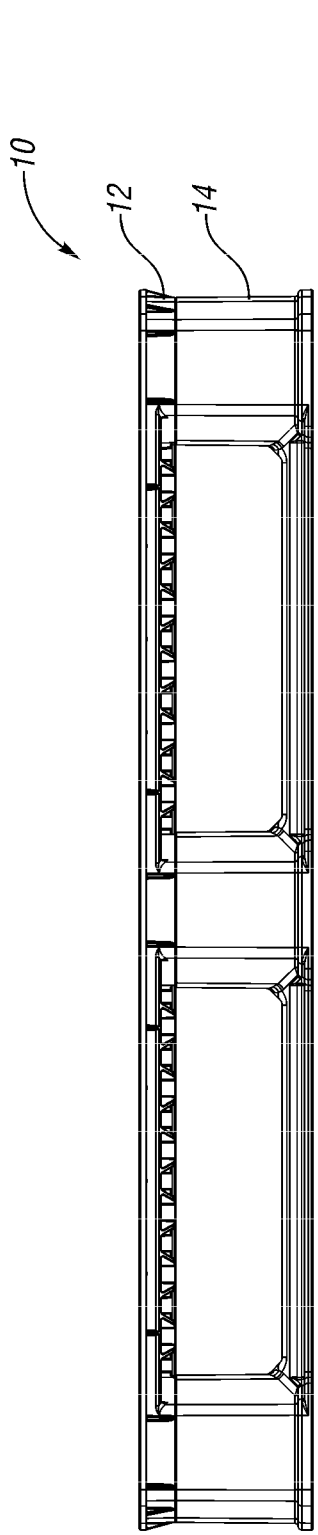
FIG. 2 is a front view of the pallet of FIG. 1.
Figure 3:
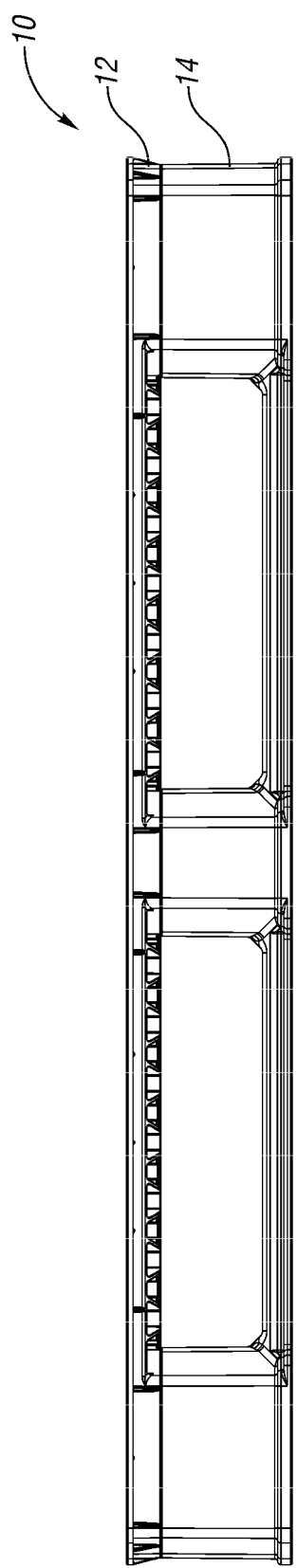
FIG. 3 is a side view of the pallet of FIG. 1.
Figure 4:
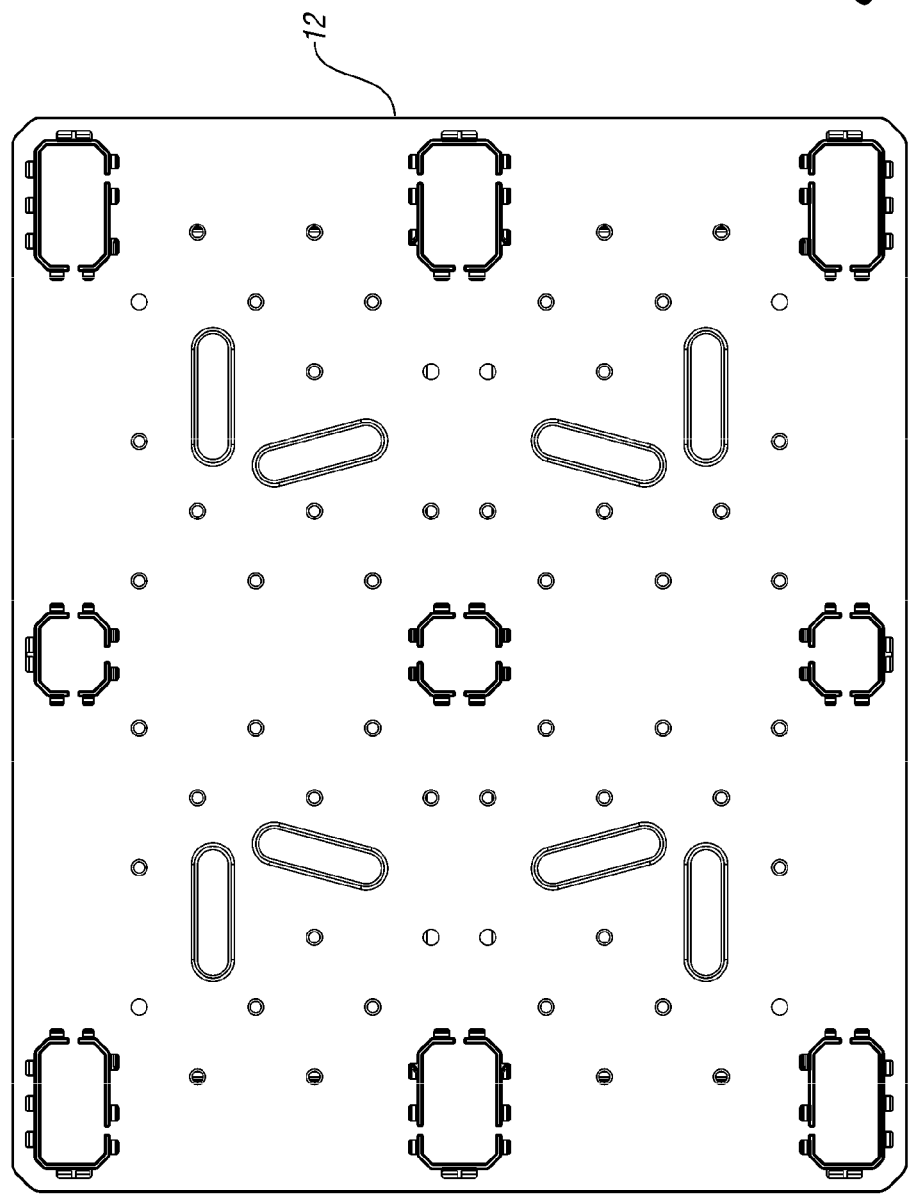
FIG. 4 is a top view of the pallet of FIG. 1.

FIGS. 2 and 3 are front and side views of the pallet assembly 10. FIG. 4 is a top view of the pallet assembly 10.

Figure 5:
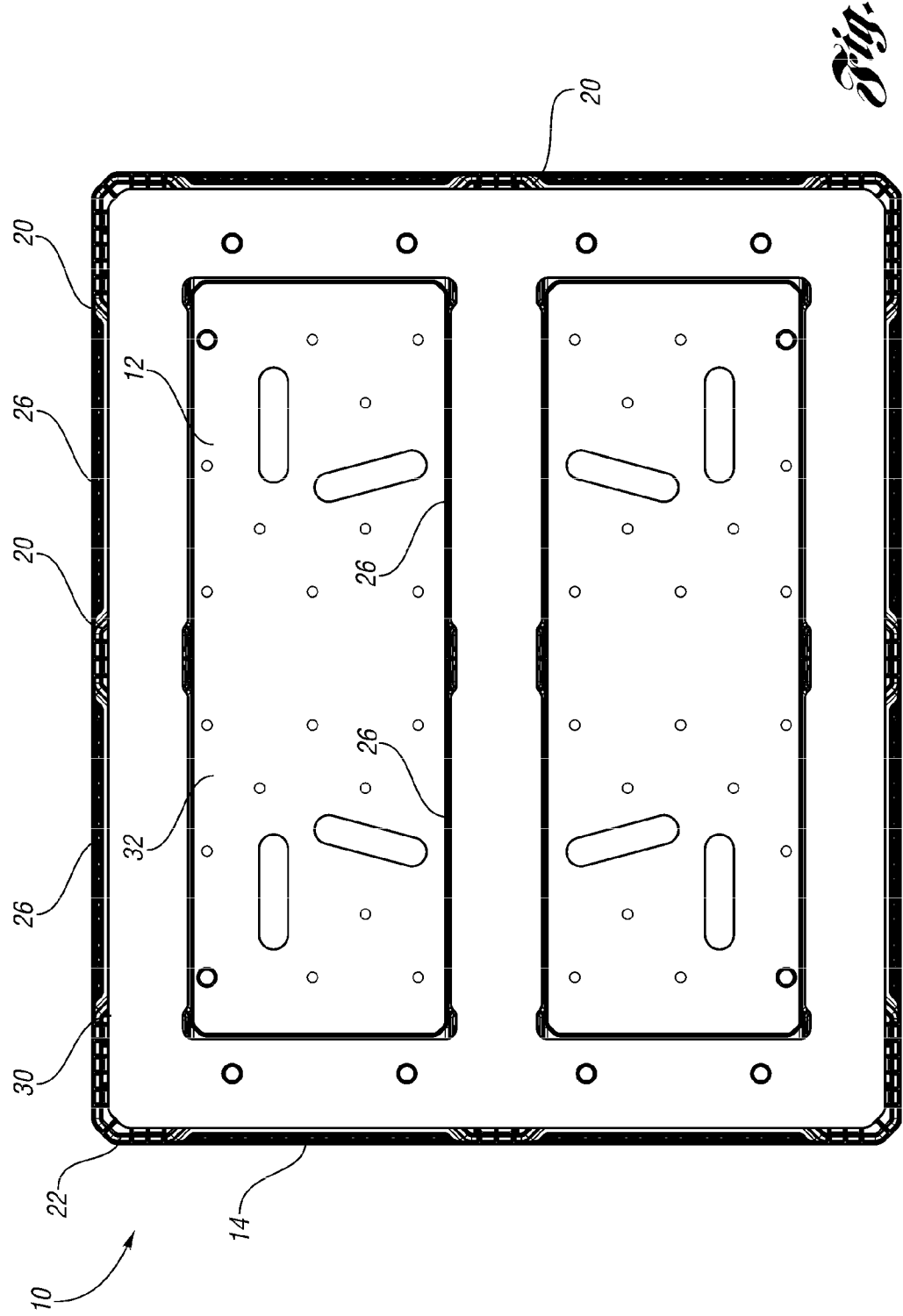
FIG. 5 is a bottom view of the pallet of FIG. 1.

FIG. 5 is a bottom view of the pallet assembly 10. As shown, the lower structure 14 includes a lower reinforcement sheet 30, shaped to align with the runners 26 and the columns 24. The upper structure 12 includes an upper reinforcement sheet 32 secured to the bottom thereof.

Figure 6:
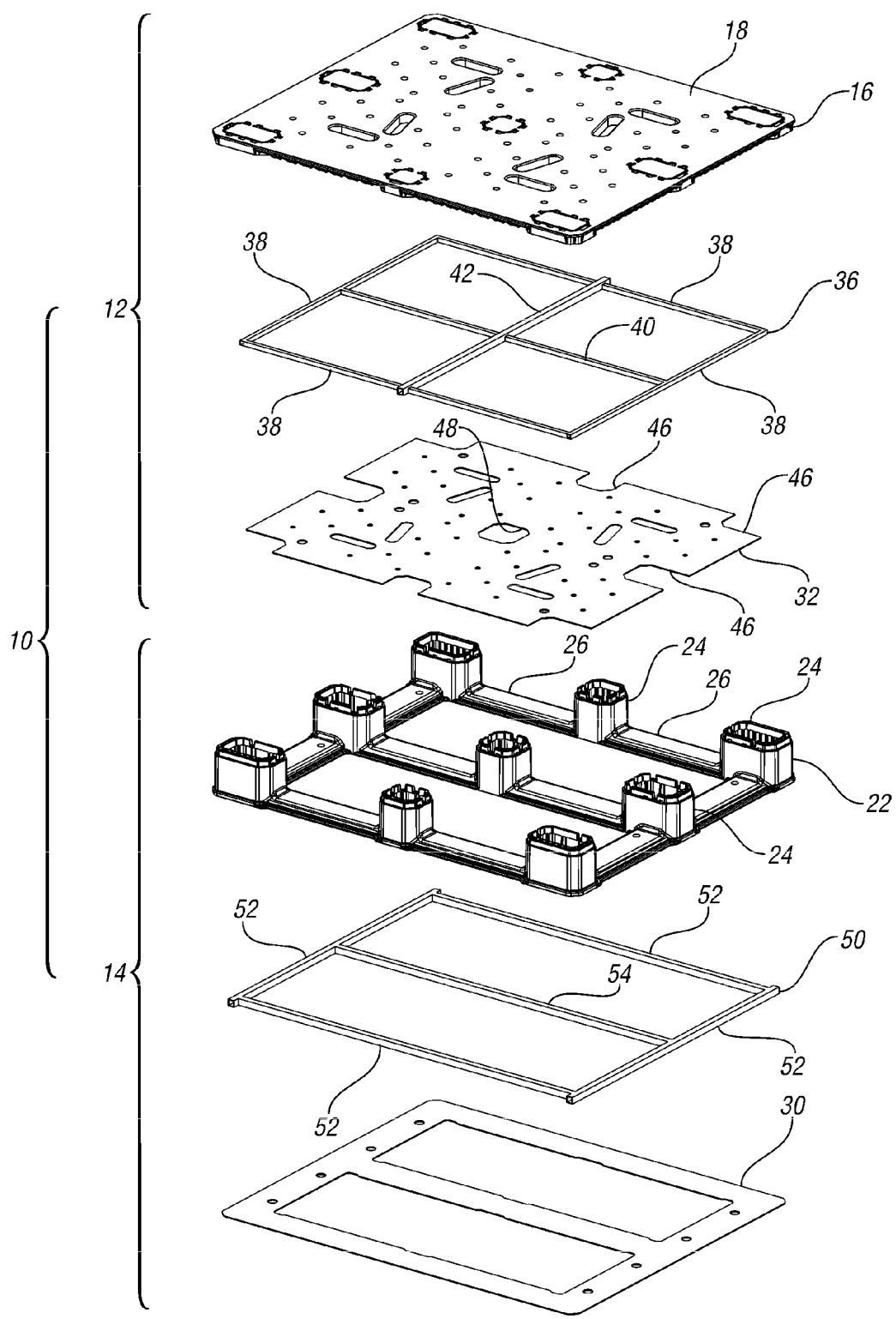
FIG. 6 is an exploded perspective view of the pallet of FIG. 1.

An exploded view of the pallet assembly 10 is shown in FIG. 6. The upper structure 12 includes the upper deck 16, reinforcement frame 36 and the upper reinforcement sheet 32. The reinforcement frame 36 includes a plurality of elongated, hollow rods, preferably having a rectangular cross-section. The rods include peripheral rods 38 forming a periphery of the reinforcement frame 36 and optionally welded to one another. A longitudinal reinforcement rod 40 extends longitudinally along a center of the reinforcement frame 36 between opposite front and rear peripheral rods 38. A lateral reinforcement rod 42 extends along a center-line between opposite side peripheral rods 38. Optional angled reinforcement rods (not shown) may extend diagonally across each of the quadrants formed by the rods 38, 40, 42.

The upper reinforcement sheet 32 is generally a planar single piece of plastic extruded as a sheet and having peripheral column openings 46 around its periphery, including the corners, and a central column opening 48.

The lower structure 14 includes the lower portion 22 integrally injection molded as a single piece of plastic including the columns 24 and runners 26. A lower reinforcement frame 50 includes a plurality of peripheral reinforcement rods 52 around a periphery, which may optionally be welded to one another. A longitudinal reinforcement rod 54 may extend along a center line longitudinally between two opposite peripheral reinforcement rods 52. A lower reinforcement sheet 30 is generally shaped to align with the bottom of the lower portion 22.

Referring again to FIG. 6, although the pallet assembly 10 is illustrated with all of the reinforcements, the pallet assembly 10 can be configured with various combinations of the reinforcements depending on the application. For example, one configuration might not include any of the reinforcements at all. Another configuration would include only the peripheral reinforcement rods 52 and the longitudinal reinforcement rod 54 in the lower structure 14 and only the longitudinal reinforcement rod 40 in the upper structure 12. Another configuration would include the peripheral reinforcement rods 52 and the longitudinal reinforcement rod 54 in the lower structure 14 and peripheral rods 38, the longitudinal reinforcement rod 40 and the lateral reinforcement rod 42 in the upper structure 12. Another configuration would include the peripheral reinforcement rods 52 and the longitudinal reinforcement rod 54 in the lower structure 14 and peripheral rods 38, the longitudinal reinforcement rod 40, the lateral reinforcement rod 42 and the angled reinforcement rods in the upper structure 12. The various reinforcement rods can be different sizes (gauge), depending on the application, as are the channels in the bottoms of the deck and runners for receiving the rods. For example, the peripheral reinforcement rods 38 (and the corresponding channels in the upper deck 16) could have a smaller cross-section (e.g. ½", which is less than half the total height of the upper deck 16) than the other rods and channels (e.g. ¾"). Therefore, when the channels are welded shut by the upper reinforcement sheet 32, the upper deck 16 will be strong with or without the peripheral reinforcement rods 38.

Figure 7:
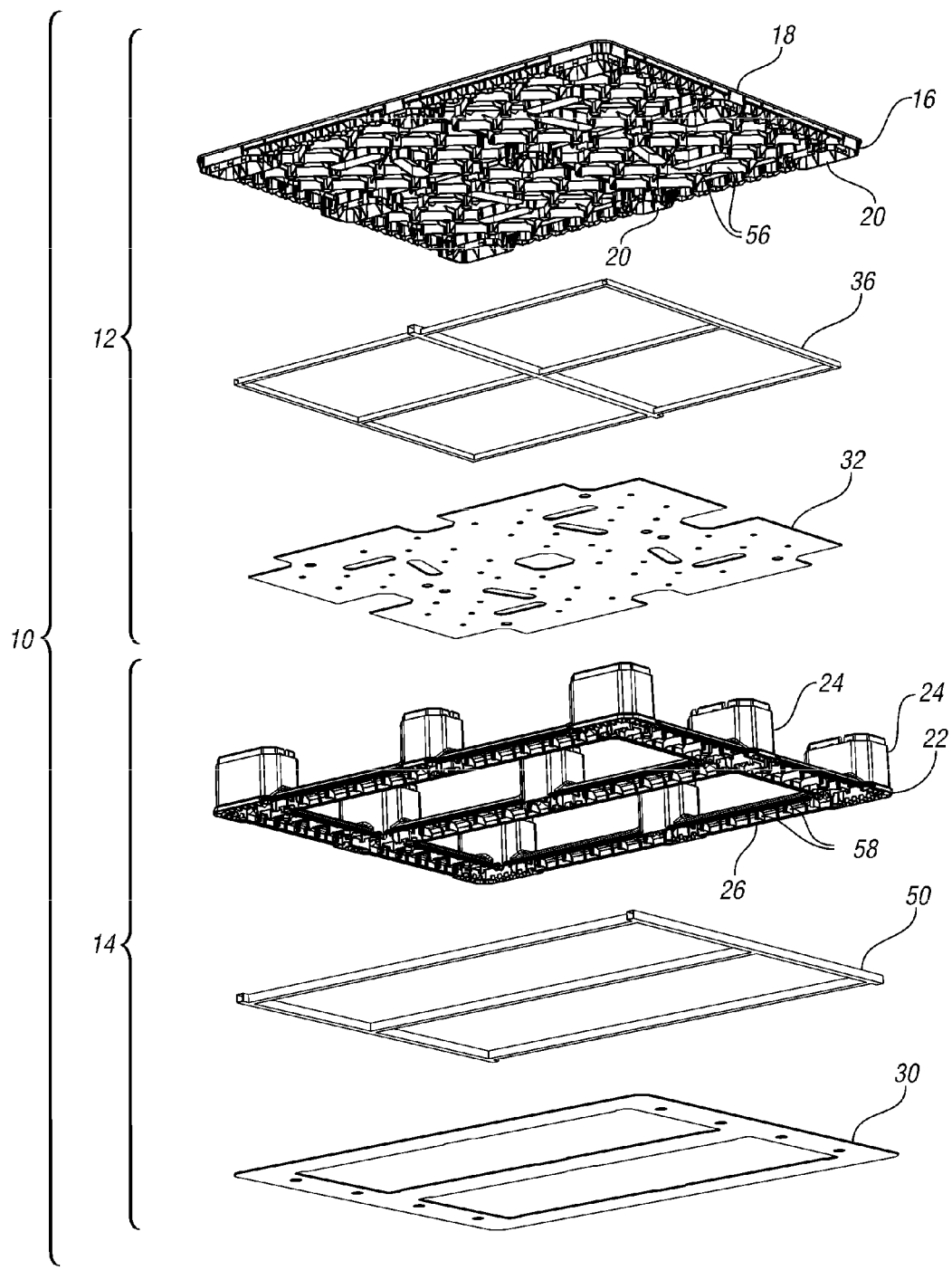
FIG. 7 is a bottom perspective view of the exploded pallet of FIG. 6.

FIG. 7 is an exploded bottom perspective view of the pallet assembly 10. The upper deck 16 includes a plurality of ribs 56 extending downwardly from the upper sheet 18. The lower portion 22 also includes a plurality of ribs 58 extending downwardly.

Figure 8:
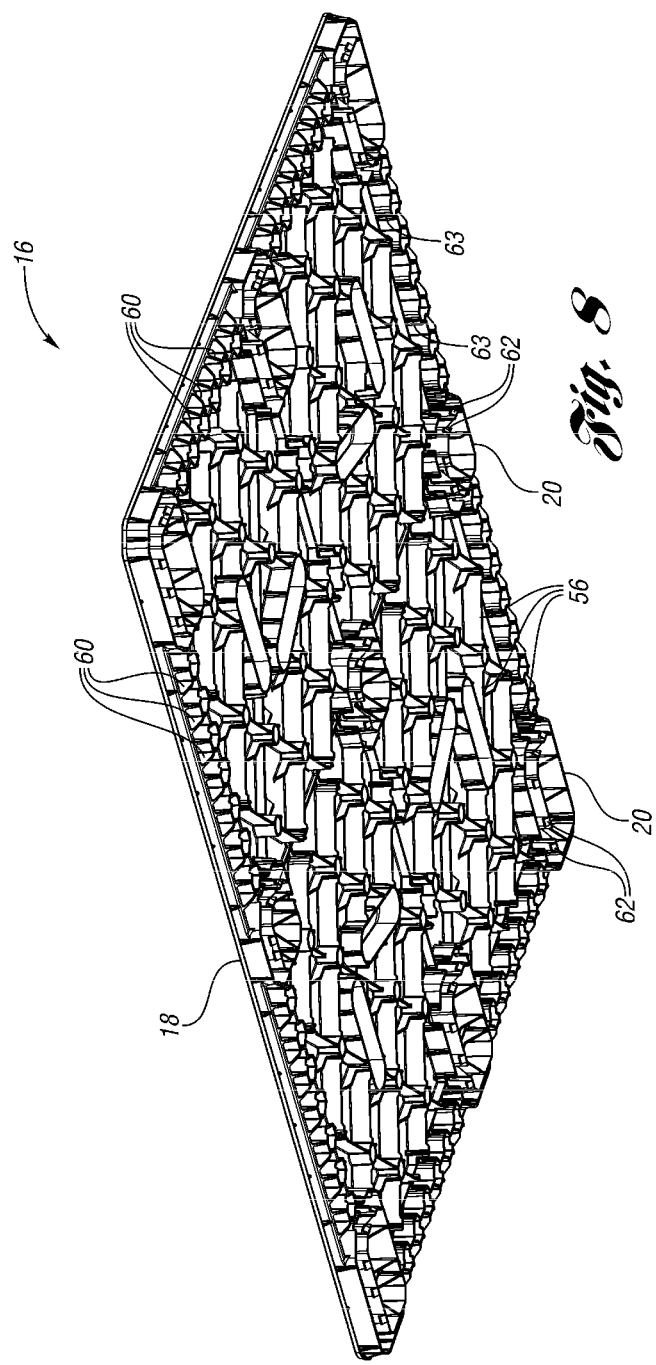
FIG. 8 is a bottom perspective view of the upper deck of the pallet of FIG. 1.

A bottom perspective view of the upper deck 16 is shown in FIG. 8. The plurality of ribs 56 and the column connectors 20 protrude downwardly from the upper sheet 18. Snap-fit connectors may be formed with the column connectors 20 for connecting to the columns 24 in a known manner. Peripheral ribs are provided along the periphery of the upper deck 16. Openings are formed between some of the ribs 56 and column connectors 20 to accommodate the upper reinforcement frame 36 (FIG. 7).

Figure 9:
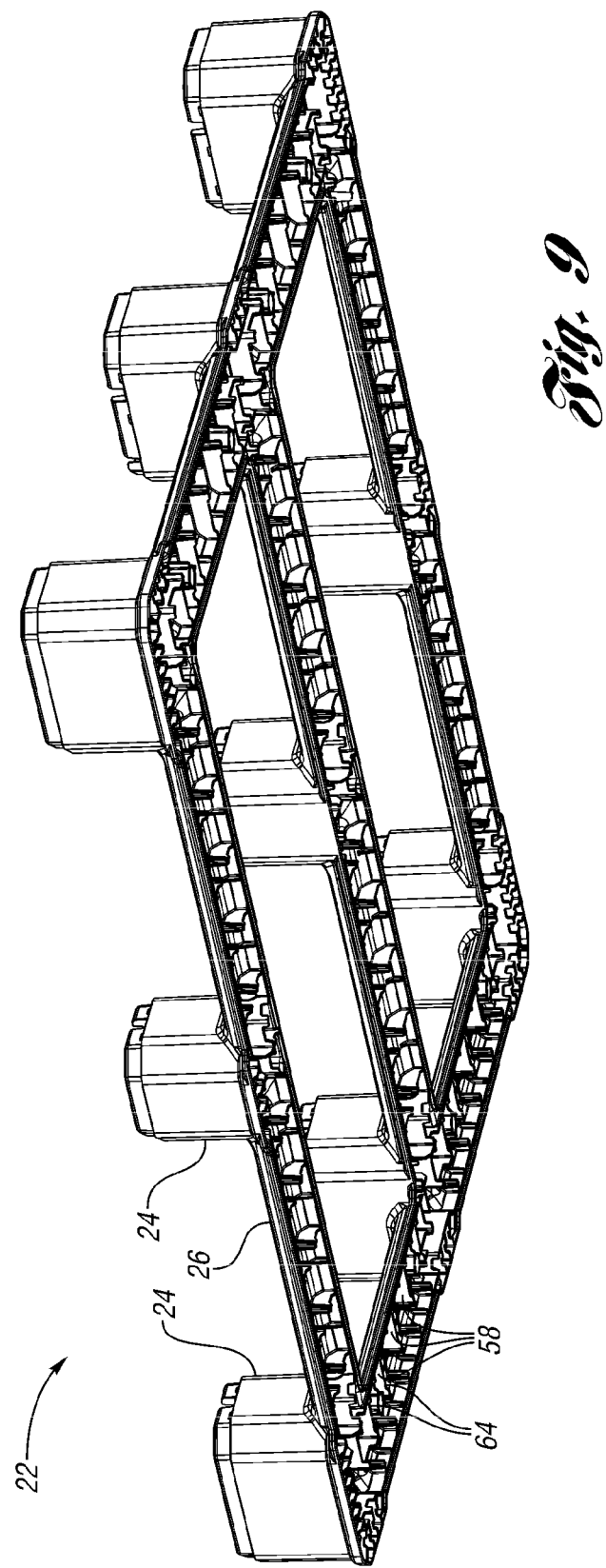
FIG. 9 is a bottom perspective view of the lower structure of the pallet of FIG. 1.

FIG. 9 is a bottom perspective view of the lower portion 22 in which the columns 24 and runners 26 are integrally molded as a single piece of plastic, such as by injection molding. A plurality of ribs 58 extend downward. Openings may be formed through the ribs 58 to accommodate the lower reinforcement frame 50 (FIG. 7).

Figure 10:
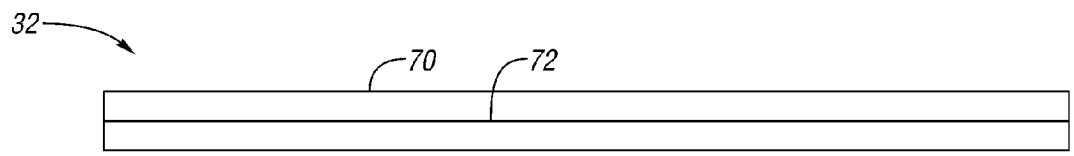
FIG. 10 is a section view of the upper reinforcement sheet of the pallet of FIG. 7.
Figure 11:
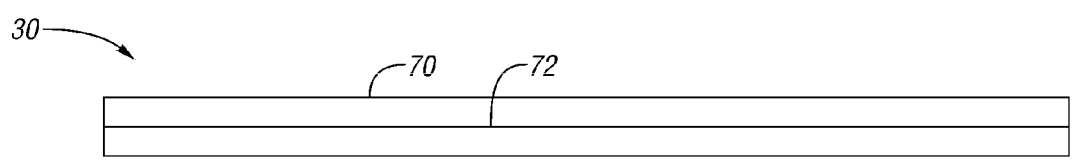
FIG. 11 is a section view of the lower reinforcement sheet of the pallet of FIG. 7.

A cross-section of a portion of the upper reinforcement sheet 32 is shown in FIG. 10. A cross-section of a portion of the lower reinforcement sheet 30 is shown in FIG. 11. Each sheet 30, 32 includes a pair of coextruded sheets or layers 70, 72 that may optionally be then die-cut to the shapes shown. The upper layer 70 is formed of a material that matches the material of the upper deck 16 and the lower portion 22. For example, the upper deck 16 and lower portion 22 may be injection molded of high density polyethylene, and the upper layer 70 may be high density polyethylene. However, "match" does not necessarily mean "identical"; rather, in this context "match" means that matched materials are selected to improve the bond between the two components. The matched materials improve the weld between the upper layer 70 and the upper deck 16 and lower portion 22 via vibration welding or hot plate welding (or adhesive, etc). The lower layer 72 is formed of a material with improved fire retardant properties (such as halogens, metal hydrates, intumescents or other additives). In a fire, the bottom surfaces of the pallet assembly 10, including the bottom of the upper deck 16 and the bottom of the lower portion 22, including the runners 26 is the most important area for fire retardant material. By coextruding the fire retardant material in the lower layer 72 with the upper layer 70 of a material that matches the structure to which the sheet is bonded, a good bond can be obtained while also obtaining good fire retardant characteristics.

Figure 12:
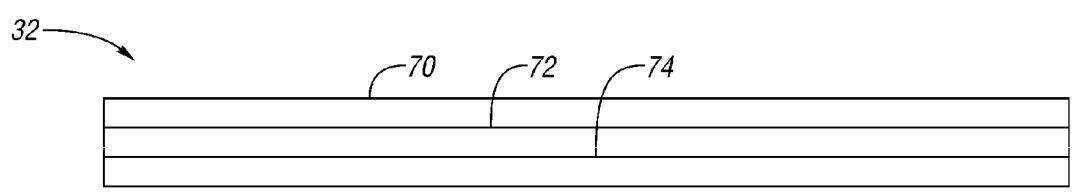
FIG. 12 is a section view of an optional upper reinforcement sheet.
Figure 13:
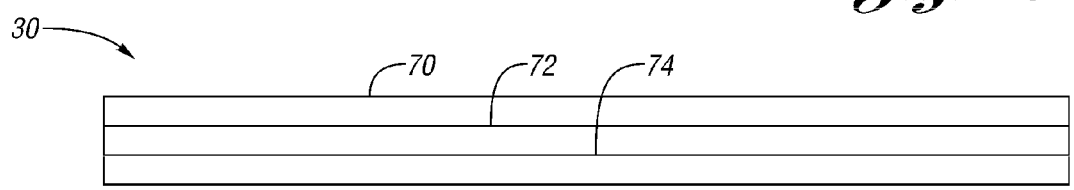
FIG. 13 is a section view of an optional lower reinforcement sheet.

FIG. 12 is a section view of an optional upper reinforcement sheet 32 and FIG. 13 is a section view of an optional lower reinforcement sheet 30. Each sheet 30, 32 includes three (or more) coextruded sheets or layers 70, 72, 74 that may be die-cut or trimmed as needed. Again, the upper layer 70 is formed of a material that matches the material of the upper deck 16 and the lower portion 22. For example, if the upper deck 16 and lower portion 22 are injection molded of high density polyethylene, then the upper layer 70 may be high density polyethylene. The matched materials improve the weld between the upper layer 70 and the upper deck 16 and lower portion 22 via vibration welding or hot plate welding (or adhesive, etc). The middle layer 72 is formed of a material with improved fire retardant properties (such as halogens, metal hydrates, intumescents or other additives). The lower layer 74 could match the upper layer 70 (and match the upper deck 16 and lower portion 22). Alternatively, the lower layer 74 may be another layer of fire retardant material (which may be the same or different material as that of the middle layer 72). As another option, one or more of the layers 72, 74 could have increased stiffness (e.g. through additives—in fact, the fire retardant additives increase stiffness too) which may increase the overall stiffness of the pallet 10. This may also increase the brittleness of the layers 72, 74; however, because the sheets 30, 32 are spaced away from the perimeter of the pallet, they will be less subject to impact from fork tines, etc.

Figure 14:
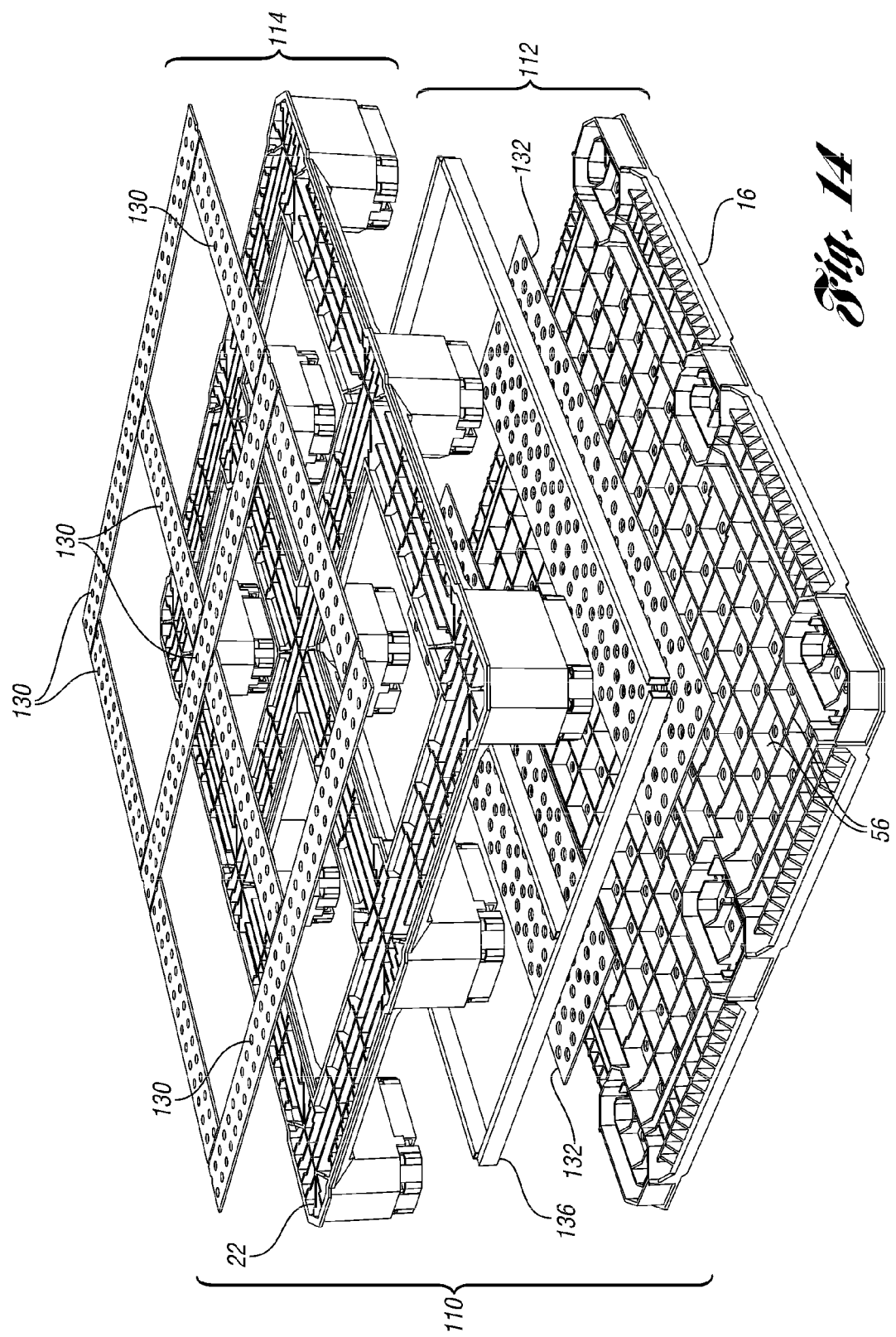
FIG. 14 is a bottom exploded perspective view of a pallet according to an alternative embodiment.

FIG. 14 is a bottom exploded perspective view of a pallet 110 according to an alternative embodiment. The upper deck 16 and lower portion 22 may be the same as before. The upper reinforcement frame 136 is similar, but only includes ones cross-bar. A lower reinforcement frame is not shown, but could be the same as before. In this embodiment, there are two upper reinforcement sheets 132 secured to the ribs 56 of the upper deck 16 (again, via vibration or hot plate welding, adhesive, etc). The upper reinforcement sheets 132 do not cover the upper reinforcement frame 136, but only cover the two large surfaces of the upper deck 16 between the upper reinforcement frame 136.

On the bottom ribs of the lower portion 22, a plurality of lower reinforcement sheets 130 (show optionally overlapping) are welded or otherwise secured. Using the plurality of narrow lower reinforcement sheets 130 in this embodiment reduces the amount of material cut sheet to form the large openings in the single, large extruded of the first embodiment.

Alternatively, the upper reinforcement sheets 132 and lower reinforcement sheets 130 could be injection molded (including the numerous apertures formed therein). In that case, there are several options for achieving improved fire resistance. First, the injection-molded plastic could include some fire retardant additive, such as magnesium hydroxide (MDH). Second, the injection-molded sheet 130, 132 could be a twin shot or multi-shot injection, such that the sheet 130, 132 has a matching upper layer and a fire retardant lower layer formed by different shots in the mold, such that the injection-molded sheets 130, 132 have an upper layer 70 (matching) and lower layer 72 (fire retardant) as in FIGS. 10-11. The injection-molded sheets 130, 132 could also have a third layer 74 (matching or some other property) as a bottom layer as in FIGS. 12-13, with all three layers formed in a multi-shot mold. As a third option, a fire retardant coating could be applied to one side of a mold prior to injection. The plastic is shot into the mold over the fire retardant coating. Again, the sheets 130, 132 include an upper layer 70 (matching) and lower layer 72 (fire retardant) as in FIGS. 10-11.

Alternatively, the fire retardant layer may be added post injection molding by applying a coating to the bottom side of the injection molded layers (in which case the lower layers 72 of FIGS. 10-11 would be the fire retardant coating and the upper layer 70 would be the injection molded layers). As yet another option, the fire retardant coating layer could also be added to an extruded sheet instead of coextruding the sheets.

The fire retardant materials and additives described herein include intumescent type materials, Aluminum Hydroxide (ATH) and magnesium hydroxide (MDH).

In accordance with the provisions of the patent statutes and jurisprudence, exemplary configurations described above are considered to represent a preferred embodiment of the invention. However, it should be noted that the invention can be practiced otherwise than as specifically illustrated and described without departing from its spirit or scope. Alphanumeric identifiers in claimed method steps are for ease of reference in dependent claims and do not signify a required sequence of such method steps unless otherwise explicitly indicated.

What is claimed is:

1. A pallet comprising:
a deck for supporting goods thereon, the deck including ribs extending downward, wherein the deck includes an upper sheet portion for supporting goods thereon, the ribs extending downward from the upper sheet portion and molded integrally with the upper sheet portion;
a plurality of columns supporting the deck; and
a reinforcement sheet secured to a bottom surface of the deck, the reinforcement sheet including a plurality of layers including a first layer having improved fire retardant properties relative to a second layer, the second layer secured to lower ends of the ribs of the deck.

2. The pallet of claim 1 wherein the first layer and the second layer are coextruded.

3. The pallet of claim 1 wherein the second layer is between the first layer and the bottom surface of the deck.

4. The pallet of claim 3 wherein the second layer is formed of a material that matches a material of the deck.

5. The pallet of claim 3 wherein the second layer is welded to the bottom surface of the deck.

6. The pallet of claim 1 further including a reinforcement member between the deck and the reinforcement sheet.

7. The pallet of claim 6 wherein the reinforcement member is a different material from the deck, the columns and the reinforcement sheet.

8. The pallet of claim 1 further including runners between lower ends of the columns, a lower reinforcement sheet secured to a lower surface of the runners, the lower reinforcement sheet formed of a plurality of layers, including one layer having increased fire retardant properties relative to another one of the plurality of layers.

9. The pallet of claim 1 wherein the first layer is a coating.

10. A pallet comprising:
a substantially planar structure having a plurality of ribs extending perpendicularly downward therefrom to free ends, the plurality of ribs formed integrally with the substantially planar structure;
a plurality of columns supporting the structure and
a reinforcement sheet secured to the free ends of the ribs, the reinforcement sheet including a plurality of layers including a first layer having improved fire retardant properties relative to a second layer.

11. The pallet of claim 10 wherein the second layer is formed of a material that matches a material of the structure.

12. The pallet of claim 11 wherein the second layer is welded to the bottom surface of the structure.

13. A method for manufacturing a pallet including the steps of:

a) injection molding a structure to have a plurality of ribs integral with an upper planar portion of the structure and extending downward from the upper planar portion of the structure;
b) forming a plurality of columns extending from the structure; and
c) securing a reinforcement sheet to a bottom surface of the ribs, the reinforcement sheet including a plurality of layers including a first layer having improved fire retardant properties relative to a second layer.

14. The method of claim 13 wherein the second layer is formed of a material that matches a material of the structure.

15. The method of claim 14 wherein the structure includes an upper deck.

16. The method of claim 15 further including the step of coextruding the first layer and the second layer together to form the reinforcement sheet.

17. The method of claim 16 further including the steps of:
d) forming the second layer of the reinforcement sheet; and
e) applying the first layer of material as a coating to the second layer.

18. The method of claim 17 wherein said step d) further includes the steps of injection molding the second layer.

19. The method of claim 13 further including the step of injection-molding the reinforcement sheet, including the first layer and the second layer.

20. The pallet of claim 1 wherein the upper sheet portion includes a substantially flat upper surface for supporting goods thereon.

21. The pallet of claim 20 wherein the ribs extending perpendicularly from the upper sheet portion.

22. The pallet of claim 21 wherein the ribs extend downward from the upper sheet portion in a direction generally parallel to one another.

23. The pallet of claim 22 wherein the first layer and the second layer are coextruded.

24. The pallet of claim 23 wherein the second layer is between the first layer and the bottom surface of the deck.

25. The pallet of claim 24 wherein the second layer is formed of a material that matches a material of the deck.

26. The pallet of claim 25 wherein the second layer is welded to the bottom surface of the deck.

27. The pallet of claim 26 further including a reinforcement member between the deck and the reinforcement sheet.

28. The pallet of claim 27 wherein the reinforcement member is a different material from the deck, the columns and the reinforcement sheet.

29. The pallet of claim 28 further including runners between lower ends of the columns, a lower reinforcement sheet secured to a lower surface of the runners, the lower reinforcement sheet formed of a plurality of layers, including one layer having increased fire retardant properties relative to another one of the plurality of layers.

* * * * *